United States Patent
Kozaki et al.

(10) Patent No.: US 11,970,194 B2
(45) Date of Patent: Apr. 30, 2024

(54) TERMINAL DEVICE AND DATA MANAGEMENT METHOD

(71) Applicant: Mitsubishi Electric Corporation, Tokyo (JP)

(72) Inventors: Mototsugu Kozaki, Tokyo (JP); Masafumi Yamada, Tokyo (JP); Yoko Itado, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 468 days.

(21) Appl. No.: 17/298,280

(22) PCT Filed: Dec. 6, 2018

(86) PCT No.: PCT/JP2018/044970
§ 371 (c)(1),
(2) Date: May 28, 2021

(87) PCT Pub. No.: WO2020/115875
PCT Pub. Date: Jun. 11, 2020

(65) Prior Publication Data
US 2022/0024500 A1 Jan. 27, 2022

(51) Int. Cl.
*B61L 15/00* (2006.01)
*B61L 27/33* (2022.01)
*G06F 16/21* (2019.01)

(52) U.S. Cl.
CPC .......... *B61L 15/0063* (2013.01); *B61L 27/33* (2022.01); *G06F 16/219* (2019.01)

(58) Field of Classification Search
CPC ...... B61L 15/0063; B61L 27/33; B61L 27/40; B61L 27/50; G06F 16/219
(Continued)

(56) References Cited

U.S. PATENT DOCUMENTS

| 2002/0004693 A1* | 1/2002 | Collins | ............ B61L 15/0054 701/19 |
| 2002/0027495 A1* | 3/2002 | Darby, Jr. | ............ B61L 25/025 340/298 |
| 2021/0114635 A1* | 4/2021 | Schulz | ............ B61L 3/125 |

FOREIGN PATENT DOCUMENTS

| JP | 10-024845 A | * | 1/1998 |
| JP | H1024845 A | | 1/1998 |

(Continued)

OTHER PUBLICATIONS

Office Action dated Aug. 18, 2022, issued in corresponding Indian Patent Application No. 202127024218, 7 pages.
(Continued)

*Primary Examiner* — Muhammad Shafi
(74) *Attorney, Agent, or Firm* — BUCHANAN INGERSOLL & ROONEY PC (57) ABSTRACT

A terminal device includes a plurality of processing devices, each of which includes: a database; a state managing unit that manages data stored in the database; a request managing unit that determines data to request from an external system and an order in which the data is to be requested from the external system based on a management state of the data in the state managing unit, a management state of data in a state managing unit of another processing device, and a type of predetermined event requiring data in a case where the predetermined event has occurred, the request managing unit being capable of requesting data from the external system on the basis of the order; and an obtainment managing unit that manages a state of obtainment of data from the external system, and a request managing unit of a predetermined processor requests data from the external system.

10 Claims, 10 Drawing Sheets

(58) Field of Classification Search
USPC .......................................................... 701/29.1
See application file for complete search history.

(56) References Cited

FOREIGN PATENT DOCUMENTS

| | | | |
|---|---|---|---|
| JP | 200-5035352 | * | 2/2005 |
| JP | 2006321264 | * | 11/2006 |
| JP | 2006321264 A | | 11/2006 |
| JP | 2016046692 | * | 4/2016 |
| JP | 2016046692 A | | 4/2016 |
| JP | 2016189652 | * | 11/2016 |
| JP | 2016189652 A | | 11/2016 |

OTHER PUBLICATIONS

International Search Report (PCT/ISA/210) with translation and Written Opinion (PCT/ISA/237) dated Feb. 19, 2019, by the Japan Patent Office as the International Searching Authority for International Application No. PCT/JP2018/044970.

* cited by examiner

| DATA UNIT 1 | VERSION: SAME |
| DATA UNIT 2 | VERSION: NOT SAME |
| DATA UNIT 3 | VERSION: SAME |
| DATA UNIT 4 | UNCLEAR WHETHER TO BE THE SAME |

FIG.6

| REQUEST ID | REASON FOR REQUEST | REQUESTING PROCESSING DEVICE | STATE |
|---|---|---|---|
| DATA UNIT 2 | EVENT CODE 1 | System-A (CH-1) | Complete |
| DATA UNIT 2 | VERSION: NOT SAME | System-B (CH-1) | Requesting |
| DATA UNIT 4 | EVENT CODE 2 | System-B (CH-1) | Waiting |

FIG.7

| REQUEST ID | Request | Receive |
|---|---|---|
| OBJECT 1 IN DATA UNIT 2 | REQUESTED | RECEIVED |
| OBJECT 2 IN DATA UNIT 2 | REQUESTED | UNRECEIVED |
| OBJECT 3 IN DATA UNIT 2 | UNREQUESTED | UNRECEIVED |

TERMINAL DEVICE AND DATA MANAGEMENT METHOD

FIELD

The present invention relates to a terminal device including a plurality of processing devices and a data management method.

BACKGROUND

In railway systems in related art, a central control device transmits data to on-board control devices on trains and to ground control devices, to share data to control operations of the trains. Patent Literature 1 discloses a technology by which an activation informing signal is transmitted upon power-on of an on-board control device of a train, and a central control device in receipt of the activation informing signal downloads the latest data to be stored in an on-board database onto an on-board control device, and downloads the latest data to be stored in a ground database onto a ground control device, so that the latest data are shared among the devices. In addition, the on-board control device described in Patent Literature 1 can include two on-board databases including an on-board database for normal use and an on-board database for backup in order to improve reliability.

CITATION LIST

Patent Literature

Patent Literature 1: Japanese Patent Application Laid-open No. 2006-321264

SUMMARY

Technical Problem

The technology of the related art is based on the assumption that the two on-board databases store the same data. If a situation in which one of the on-board databases cannot receive data occurs in the process of storage of data in the on-board databases, the data in one of the two on-board databases becomes different from that in the other on-board database. When the operation is switched from the on-board database for normal use to the on-board database for backup under such a situation, there is a problem of the difference in the stored data between the two databases being a possible source of an accident.

The present invention has been made in view of the above, and an object thereof is to provide a terminal device including a plurality of processing devices, the terminal device being capable of reducing the difference between data stored in databases of the processing devices.

Solution to Problem

To solve the aforementioned problems and achieve the object, the present invention provides a terminal device comprising a plurality of processing devices, wherein the processing devices each includes: a database; a state managing circuitry to manage data stored in the database; a request managing circuitry to determine data to request from an external system and an order in which the data is to be requested from the external system on the basis of a management state of the data in the state managing circuitry, a management state of data in a state managing circuitry of another processing device, and a type of predetermined event requiring data in a case where the predetermined event has occurred, the request managing circuitry being capable of requesting data from the external system on the basis of the order; and an obtainment managing circuitry to manage a state of obtainment of data from the external system. A request managing circuitry of a predetermined processing device requests data from the external system.

Advantageous Effects of Invention

According to the present invention, the terminal device including a plurality of processing devices produces an advantageous effect of reducing the difference between the data stored in the databases of the processing devices.

DESCRIPTION OF EMBODIMENT

A terminal device and a data management method according to an embodiment of the present invention will be described in detail below with reference to the drawings. Note that the present invention is not limited to the embodiment.

EMBODIMENT

Figure 1:
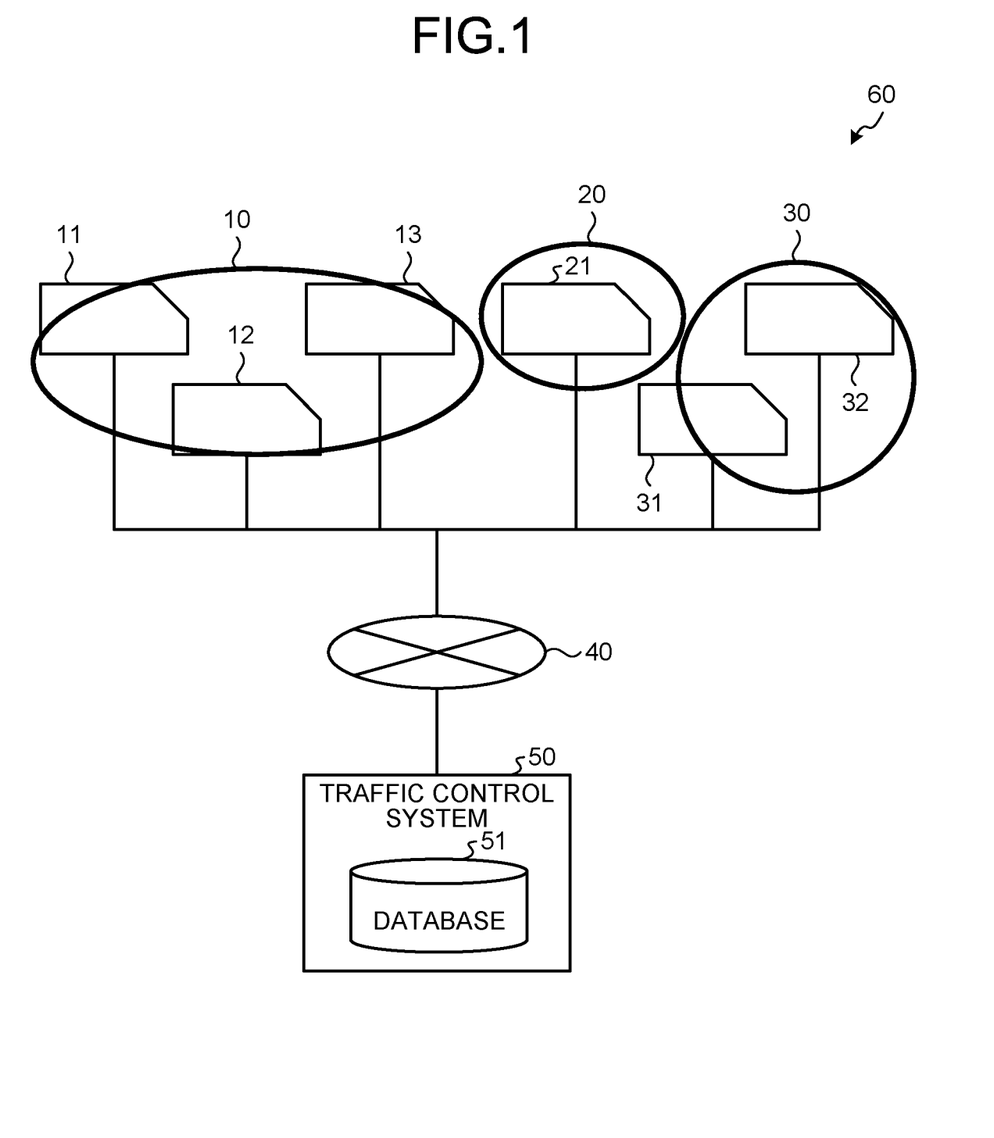
FIG. 1 is a diagram illustrating an example of a configuration of a train control system.

FIG. 1 is a diagram illustrating an example of a configuration of a train control system 60 according to an embodiment of the present invention. The train control system 60 includes a traffic control system 50, and trains 11, 12, 13, 21, 31, and 32. The train control system 60 is a system in which the traffic control system 50 controls operations of trains 11, 12, 13, 21, 31, and 32 via a communication network 40.

The communication network 40 is a network connecting the traffic control system 50 with the trains 11, 12, 13, 21, 31, and 32. The communication network 40 may be a dedicated network, or a general-purpose network such as the Internet.

The traffic control system 50 includes a database 51. The database 51 stores the latest data necessary for controlling operations of the trains 11, 12, 13, 21, 31, and 32. The traffic control system 50, which is an external system, transmits data stored in the database 51 to the individual trains and shares the data with the individual trains for controlling the operations of the individual trains. In addition, the traffic control system 50 transmits, to the trains 11, 12, 13, 21, 31, and 32, data version information indicating the latest version of data stored in databases of the individual trains.

In the train control system 60, different kinds of trains may operate. In FIG. 1, assume, for example, that the trains 11, 12, and 13 are trains from A Company, the train 21 is a train from B Company, and the trains 31 and 32 are trains from C Company. Pieces of data necessary for the operations of the different kinds of trains can differ from one another. In other words, data necessary for train operations may vary among the trains 11, 12, and 13 in an A Company group 10, the train 21 in a B Company group 20, and the trains 31 and 32 in a C Company group 30. In such a case, in the train control system 60, upon receiving from each of the trains a request for data, the traffic control system 50 transmits the requested data to the corresponding one of the trains. As a result, each train can obtain data necessary for the operation of the train, and data can be shared between the traffic control system 50 and the individual trains.

Figure 2:
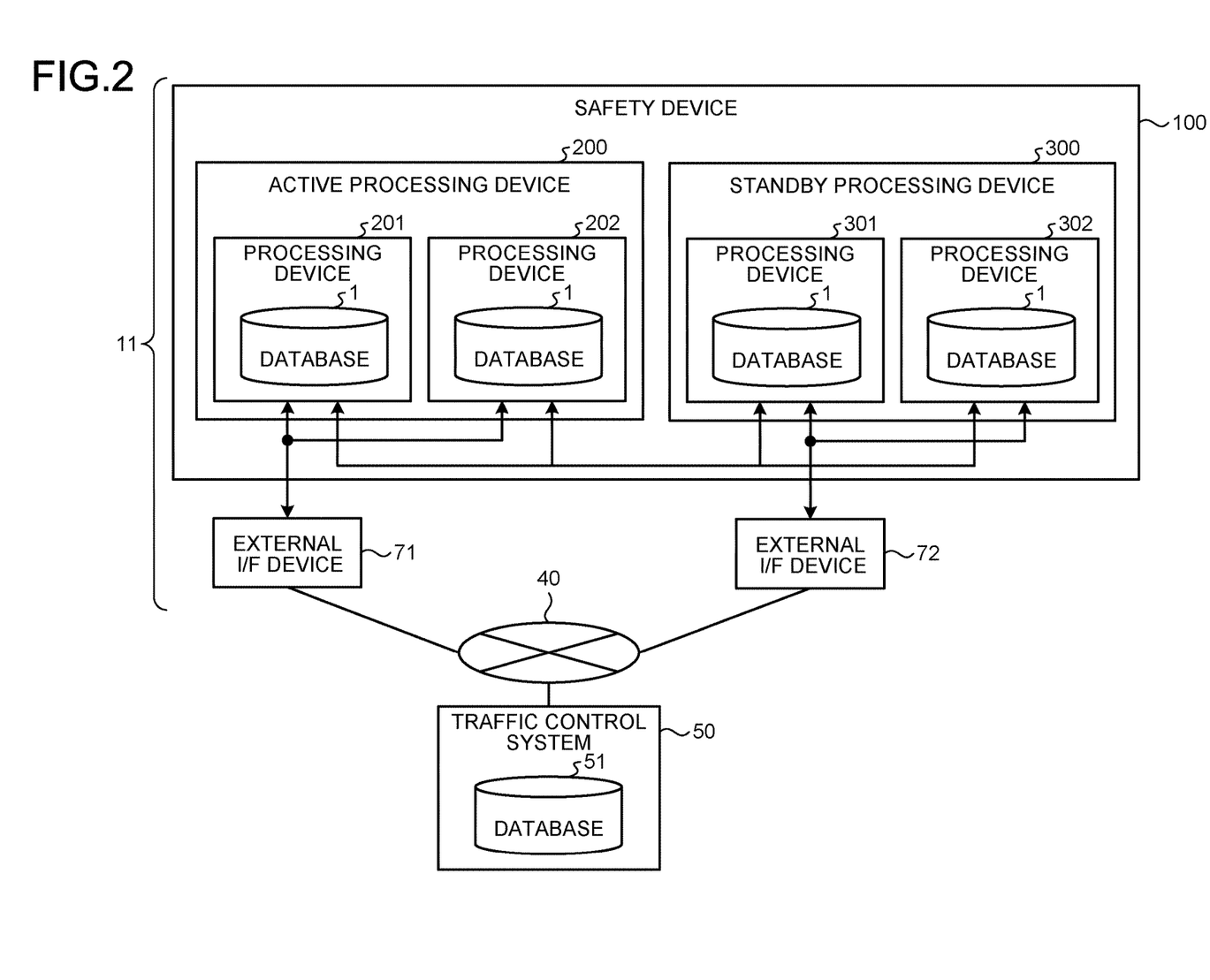
FIG. 2 is a diagram illustrating an example of a configuration of a safety device included in a train.

A description will be made as to a process through which, for example, the train 11 obtains, from the traffic control system 50, data necessary for the operation thereof. FIG. 2 is a diagram illustrating an example of a configuration of a safety device 100 of the train 11 according to the present embodiment. The train 11 includes the safety device 100, and external interface (hereinafter referred to as I/F) devices 71 and 72. Note that, in FIG. 2, only components necessary for the train 11 to obtain data from the traffic control system 50 are illustrated, but common components are not illustrated.

The safety device 100 is a terminal device including an active processing device 200, and a standby processing device 300. The active processing device 200 controls the operation of the train 11 during normal operation. The active processing device 200 includes processing devices 201 and 202. The processing devices 201 and 202 of the active processing device 200 perform identical computation processes, and when the computation results match each other, the active processing device 200 controls the operation of the train 11 on the basis of the computation results. The standby processing device 300 controls the operation of the train 11 instead of the active processing device 200 when the active processing device 200 is not operating normally because of, for example, a breakdown. The standby processing device 300 includes processing devices 301 and 302. The processing devices 301 and 302 of the standby processing device 300 perform identical computation processes, and when the computation results match each other, the standby processing device 300 controls the operation of the train 11 on the basis of the computation results.

As discussed above, the safety device 100 includes a plurality of processing devices 201, 202, 301, and 302. Assume that the processing devices 201, 202, 301, and 302 have similar configurations. The processing devices 201, 202, 301, and 302 are central processing units (CPUs), for example. The processing devices 201, 202, 301, and 302 each include a database 1 for storing data necessary for performing identical computation processes.

In the safety device 100, the processing devices 201, 202, 301, and 302 perform computation processes asynchronously and independently. As illustrated in FIG. 2, the processing devices 201 and 202 obtain data necessary for the operation of the train 11 from the traffic control system 50 via the communication network 40 and the external I/F device 71. Similarly, the processing devices 301 and 302 obtain data necessary for the operation of the train 11 from the traffic control system 50 via the communication network 40 and the external I/F device 72. The processing devices 201, 202, 301, and 302 of the safety device 100 can receive data from the traffic control system 50 at different timings because, for example, the processing devices 201, 202, 301, and 302 perform computation processes independently of each other, or the external I/F devices 71 and 72 differ from each other in communication condition.

Figure 3:
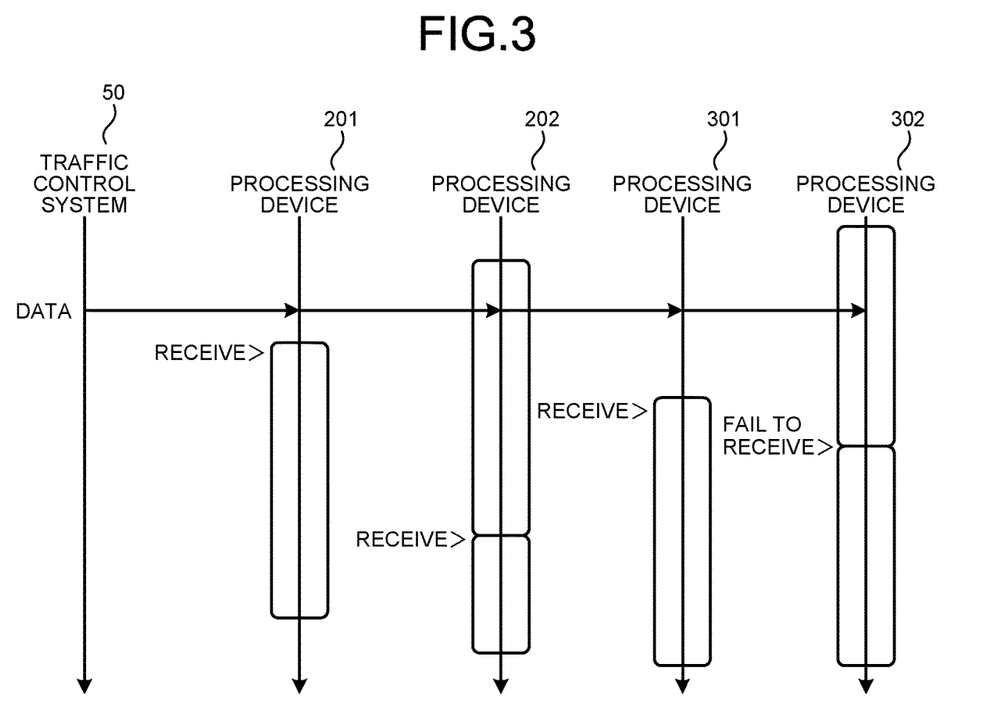
FIG. 3 is a chart illustrating an example of timings at which processing devices receive data from a traffic control system in the safety device.

FIG. 3 is a chart illustrating an example of the timings at which the processing devices 201, 202, 301, and 302 receive data from the traffic control system 50 in the safety device 100 according to the present embodiment. In FIG. 3, vertically long rectangles represent data. As illustrated in FIG. 3, the processing devices 201, 202, 301, and 302 receive data at different timings. In such a situation, in some cases, some processing devices successfully receive data but others not. In other words, the processing devices 201, 202, 301, and 302, which perform identical computation processes, may hold different pieces of date.

For example, if the data held in the processor 201 is different from that in the processor 202, the computation results of the processing devices 201 and 202 can fail to match each other, with the result that the active processing device 200 can fail to control the operation of the train 11. If the data held in the processor 301 is different from that in the processor 302, the computation results of the processing devices 301 and 302 can fail to match each other, with the result that the standby processing device 300 can fail to control the operation of the train 11 in the event of a breakdown of the active processing device 200. If the data held in the processing devices 201 and 202 is different from that in the processing devices 301 and 302, the standby processing device 300 holding the different data from that held by the active processing device 200 provides the different computation result from that provided by the active processing device 200, which can be a source of accident in the event that the processing device to control the train 11 is switched from active processing device 200 to the standby processing device 300.

In the present embodiment, each processing device of the safety device 100 manages the states of data held by the processing devices 201, 202, 301, and 302, and a predetermined one of the processing devices requests data from the traffic control system 50. This makes it less likely or unlikely to result in the situation where the data held by one of the processing devices 201, 202, 301, and 302 of the safety device 100 differs from that held in the others.

Figure 4:
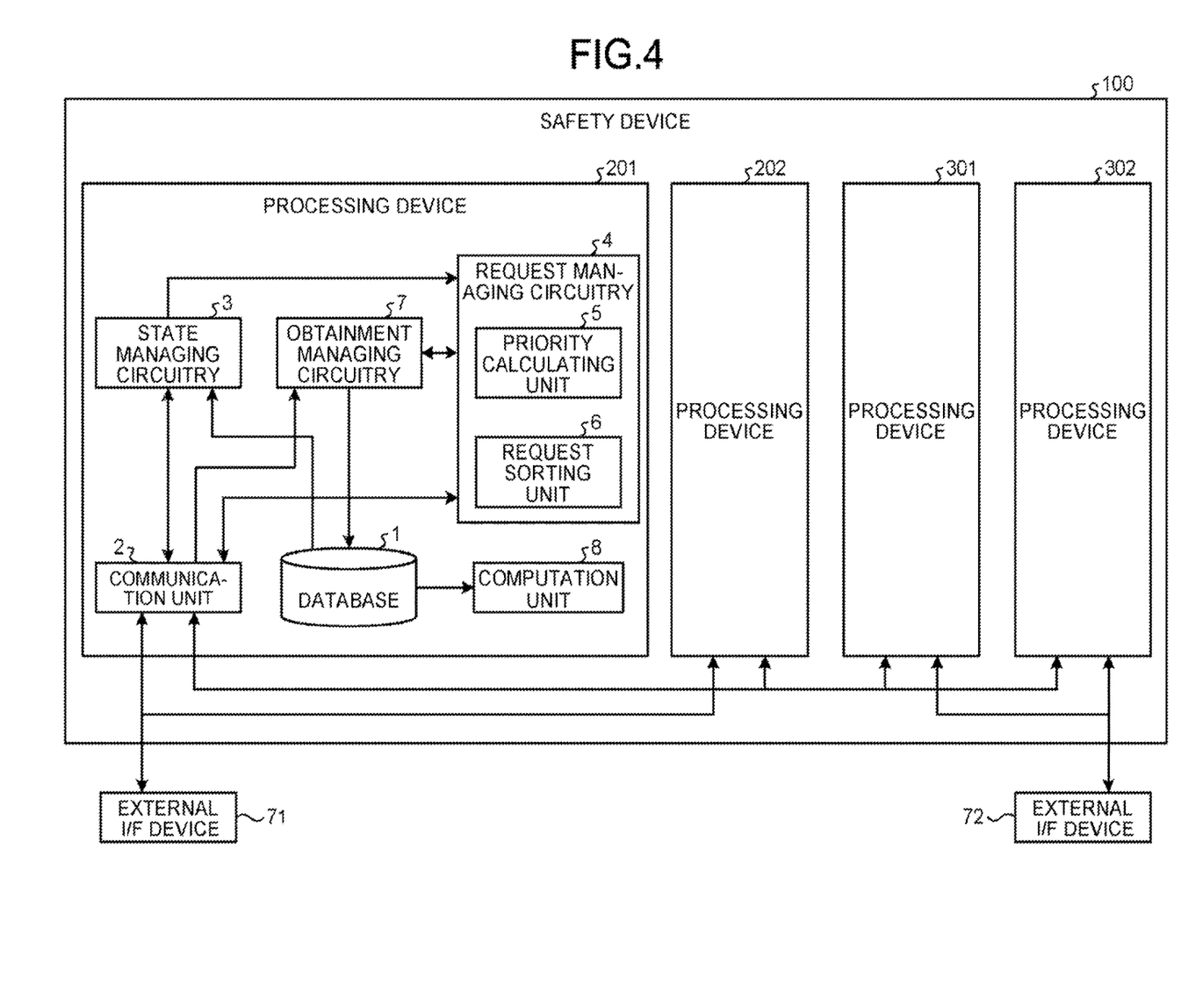
FIG. 4 is a block diagram illustrating an example of a configuration of a processing device included in the safety device.

Because the processing devices 201, 202, 301, and 302 have similar configurations as described above, the configuration and the operations thereof will be described with reference to the processor 201 as an example. FIG. 4 is a block diagram illustrating an example of a configuration of the processor 201 included in the safety device 100 according to the present embodiment. In FIG. 4, the illustration of the processing devices 202, 301, and 302 is simplified. The processing device 201 includes the database 1, a communication unit 2, a state managing circuitry 3, a request managing circuitry 4, an obtainment managing circuitry 7, and a computation unit 8. The request managing circuitry 4 includes a priority calculating unit 5, and a request sorting unit 6.

The database 1 is a storage unit that stores data necessary for the computation unit 8 to perform computation processes. Data obtained from the traffic control system 50 is added to the database 1. The data stored in the database 1 are updated with data obtained from the traffic control system 50.

The communication unit 2 obtains data from the traffic control system 50 via the communication network 40 and the external I/F device 71. The communication unit 2 outputs the obtained data to the obtainment managing circuitry 7. The communication unit 2 obtains data version information from the traffic control system 50 via the communication network 40 and the external I/F device 71. The data version information indicates the latest version of data stored in the database 1. The communication unit 2 outputs the obtained data version information to the state managing circuitry 3. Under the control of the request managing circuitry 4, the communication unit 2 requests data from the traffic control system 50 via the external I/F device 71 and the communication network 40.

The communication unit 2 also obtains, from the request managing circuitry 4, a first request queue generated by the request managing circuitry 4, and transmit the first request queue to the other processing devices. The first request queue generated by the request managing circuitry 4 will be described later. The communication unit 2 obtains, from the other processing devices, first request queues generated by the other processing devices. The communication unit 2 outputs the obtained first request queues to the request managing circuitry 4. Alternatively, the communication unit 2 may be configured to have separate functions, such as a transmission unit that performs transmission processes and a reception unit that performs reception processes.

Figure 5:
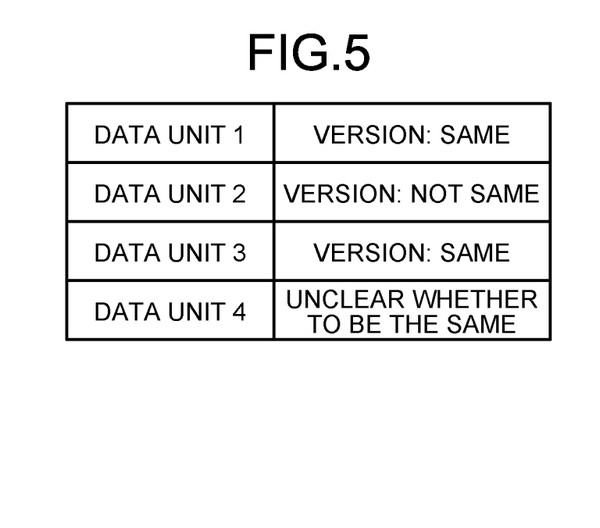
FIG. 5 is a table illustrating an example of version management information held by a state managing circuitry of the processing device.

The state managing circuitry 3 manages data stored in the database 1. More specifically, the state managing circuitry 3 manages, on a data-unit by data-unit basis, whether or not the version of the data stored in the database 1 is the same as the latest version indicated by the data version information obtained from the traffic control system 50 that is an external system. FIG. 5 is a table illustrating an example of version management information held by the state managing circuitry 3 in the processing device 201 according to the present embodiment. The version management information illustrated in FIG. 5 indicates that, among the data stored in the database 1, the data identified by the name "data unit 1" is of the latest version, the data identified by the name "data unit 2" is not of the latest version, the data identified by the name "data unit 3" is of the latest version, and it is unclear whether or not data identified by the name "data unit 4" is of the latest version. The state managing circuitry 3 outputs the version management information illustrated in FIG. 5 to the request managing circuitry 4. The request managing circuitry 4 generates the first request queue on the basis of the management state of data in the state managing circuitry 3 and a type of predetermined event that requires data in a case where the predetermined event has occurred. The first request queue indicates data to be requested from the traffic control system 50 and the order in which the data is to be requested. Among the data managed in the state managing circuitry 3, the request managing circuitry 4 identifies the data of not the same version as the latest version, as the data to request from the traffic control system 50. The case where a predetermined event that requires data has occurred is, for example, a case where the train 11 with the safety device 100 installed therein travels within a travel section and reaches a point a predetermined distance before a switching point between that travel section and the next travel section. Data required in the case where a predetermined event has occurred is, for example, data necessary for the train to travel within the next section, such as a speed limit set at each point within the next travel section. The request managing circuitry 4 outputs the generated first request queue to the other processing devices via the communication unit 2.

In addition, the request managing circuitry 4 obtains, from the other processing devices, first request queues generated by the other processing devices. The first request queues generated by the other processing devices are first request queues generated by the request managing circuitries 4 of the other processing devices on the basis of the management states of data in the state managing circuitries 3 of the other processing devices and types of predetermined events that require data in cases where the predetermined events have occurred. The request managing circuitry 4 combines the generated first request queue with the obtained first request queues to generate a second request queue indicating data to be requested from the traffic control system 50 by the safety device 100 and the order in which the data are to be requested. The request managing circuitry 4 is capable of requesting data from the traffic control system 50 via the communication unit 2, the external I/F device 71, and the communication network 40 by using the second request queue.

Among the processing devices of the safety device 100 that currently control the train 11 is a processing device for channel 1. The request managing circuitry 4 of this processing device for channel 1, for example, requests data from the traffic control system 50 via the communication unit 2, the external I/F device, and the communication network 40 by using the second request queue. Specifically, during normal operation, the request managing circuitry 4 of the processing device 201 for channel 1 of the active processing device 200 request data from the traffic control system 50 via the communication unit 2, the external I/F device 71, and the communication network 40 by the second request queue. When the active processing device 200 fails to operate normally because of, for example, the breakdown, the request managing circuitry 4 of the processing device 301 for channel 1 of the standby processing device 300 requests data from the traffic control system 50 via the communication unit 2, the external I/F device 72, and the communication network 40 by using the second request queue.

In the safety device 100, the request managing circuitry 4 of a predetermined one of the processing devices requests data from the traffic control system 50 by using the second request queue. In the safety device 100, that is, a single processing device alone requests data from the traffic control system 50. Thus, the safety device 100 can prevent communication traffic between the safety device 100 and the traffic control system 50 from increasing as compared with a case where a plurality of processing devices request data from the traffic control system 50.

When the request managing circuitry 4 generates a first request queue, the priority calculating unit 5 determines, on the basis of the reason for request, the order in which data is to be requested from the traffic control system 50. The reason for request is the reason for which data is to be requested from the traffic control system 50. The priority calculating unit 5 holds a request reason priority table in which the priorities of individual reasons for request are set in advance, for example. The priority calculating unit 5 determines, on the basis of the request reason priority table, the order in which data are to be requested from the traffic control system 50.

When the request managing circuitry 4 generates a second request queue, the priority calculating unit 5 determines, on the basis of the reasons for request and the priorities of the individual processing devices, the order in which data is to be requested from the traffic control system 50. The reasons for request are the reasons for which data is to be requested from the traffic control system 50. Note that, when the processing device to control the train 11 is changed in the safety device 100, the priorities of the processing devices are changed. For example, when the processing device to control the train 11 is switched from the active processing device 200 to the standby processing device 300, the priorities of the processing devices are changed. In this case, when the request managing circuitry 4 generates a second request queue, the priority calculating unit 5 determines the order in which data is to be requested from the traffic control system 50, on the basis of the reasons for request, that is, the reasons for which data is to be requested from the traffic control system 50, and the changed priorities of the individual processing devices. The priorities of the processing devices may be changed by the request managing circuitry 4 or the computation unit 8 that practically controls the operation of the train 11.

The priority calculating unit 5 holds the request reason priority table described above, and a processing-device priority table, for example. In the processing-device priority table, the priorities of the individual processing devices are set in advance. The priority calculating unit 5 determines the order in which data are to be requested from the traffic control system 50, on the basis of the request reason priority table and the processing-device priority table. When the active processing device 200 controls the operation, for example, the processing-device priority table sets the priorities of the processing device or 201 for channel 1 of the active processing device 200, the processing device 202 for channel 2 of the active processing device 200, the processing device 301 for channel 1 of the standby processing device 300, and the processing device 302 for channel 2 of the standby processing device 300 in descending order. The processor priority table may be dynamically changed depending on the operation state of the safety device 100. When the standby processing device 300 controls the operation, for example, the processing-device priority table sets the priorities of the processing device 301 for channel 1 of the standby processing device 300, the processing device 302 for channel 2 of the standby processing device 300, the processing device 201 for channel 1 of the active processing device 200, the processing device 202 for channel 2 of the active processing device 200 in descending order.

The request sorting unit 6 generates the above-described first request queue by sorting records describing information on individual data in the order of request within a request queue on the basis of the order in which the data is to be requested from the traffic control system 50 determined by the priority calculating unit 5. In addition, the request sorting unit 6 generates the above-described second request queue by sorting records describing information on individual data in the order of request within a request queue on the basis of the order in which the data are to be requested from the traffic control system 50 determined by the priority calculating unit 5. Assume that the "request queue" without the prefix "first" or "second" has records unsorted.

Figure 6:
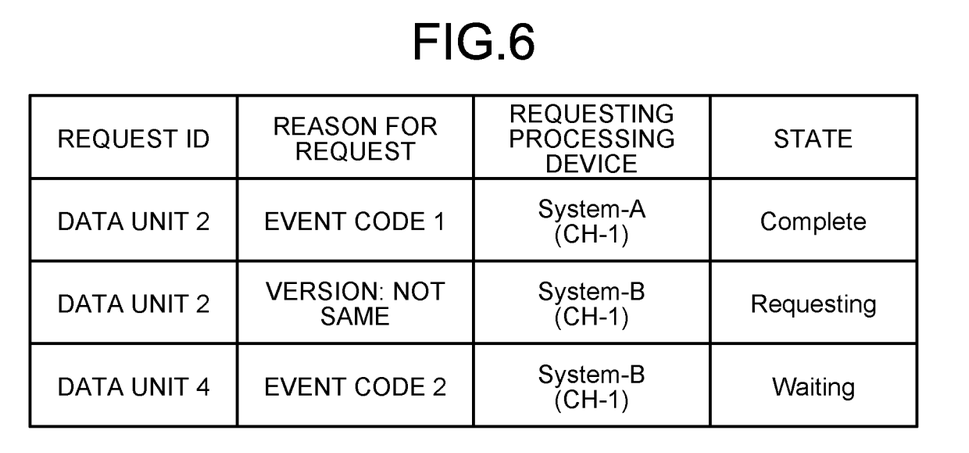
FIG. 6 is a table illustrating an example of a second request queue generated by a request managing circuitry of the processing device.

FIG. 6 is a table illustrating an example of the second request queue generated by the request managing circuitry 4 of the processor 201 according to the present embodiment. The second request queue illustrated in FIG. 6 has records sorted by the request sorting unit 6. The first row in FIG. 6 corresponds to records describing information on requested data. In FIG. 6, a request ID represents identification information for identifying individual data. In FIG. 6, a reason for request represents the reason for which data is to be requested from the traffic control system 50. In FIG. 6, a requesting processing device represents the processing device that has determined to request, from the traffic control system 50, data identified the request ID. In FIG. 6, the active processing device 200 is represented by System-A, and the standby processing device 300 is represented by System-B. In FIG. 6, a state indicates whether or not data is requested from the traffic control system 50. Note that the first request queue generated by the request managing circuitry 4 has a structure similar to the second request queue illustrated in FIG. 6. In the case of the first request queue, the processing that generates the first request queue is shown under the item "requesting processing device".

The obtainment managing circuitry 7 obtains data from the traffic control system 50 via the communication network 40, the external I/F device 71, and the communication unit 2. When the same data as the obtained data is not present in the database 1, the obtainment managing circuitry 7 stores the obtained data in the database 1. When data of the same kind as, but in a different version from, the obtained data is stored in the database 1, the obtainment managing circuitry 7 updates the data stored in the database 1 with the obtained data. In addition, the obtainment managing circuitry 7 manages the state of obtainment of data from the traffic control system 50. Specifically, the obtainment managing circuitry 7 manages whether or not the data indicated in the second request queue is requested from the traffic control system 50 and whether or not the data is obtained from the traffic control system 50.

Figure 7:
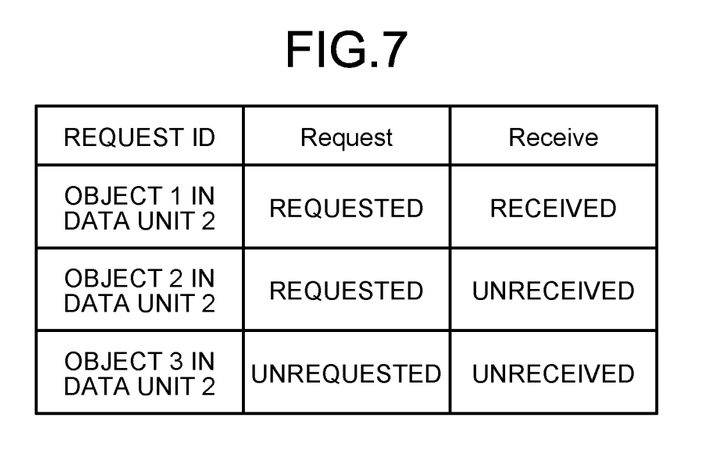
FIG. 7 is a table illustrating an example of data obtainment management information held by an obtainment managing circuitry of the processing device.

FIG. 7 is a table illustrating an example of data obtainment management information held by the obtainment managing circuitry 7 of the processor 201 according to the present embodiment. In FIG. 7, a request ID represents identification information for identifying data to be requested from the traffic control system 50. Note that, as illustrated in FIG. 7, when the data size is large, the data is divided into a plurality of pieces of data, each of the pieces of data obtained by the division is used as a data unit to be requested from the traffic control system 50, and identification information is assigned to each data unit. In FIG. 7, the item "request" indicates whether or not data is requested from the traffic control system 50. In FIG. 7, the item "receive" indicates whether or not data is obtained from the traffic control system 50.

The computation unit 8 performs computation processes by using data stored in the database 1, and controls the operation of the train 11 by using the computation results.

Figure 8:
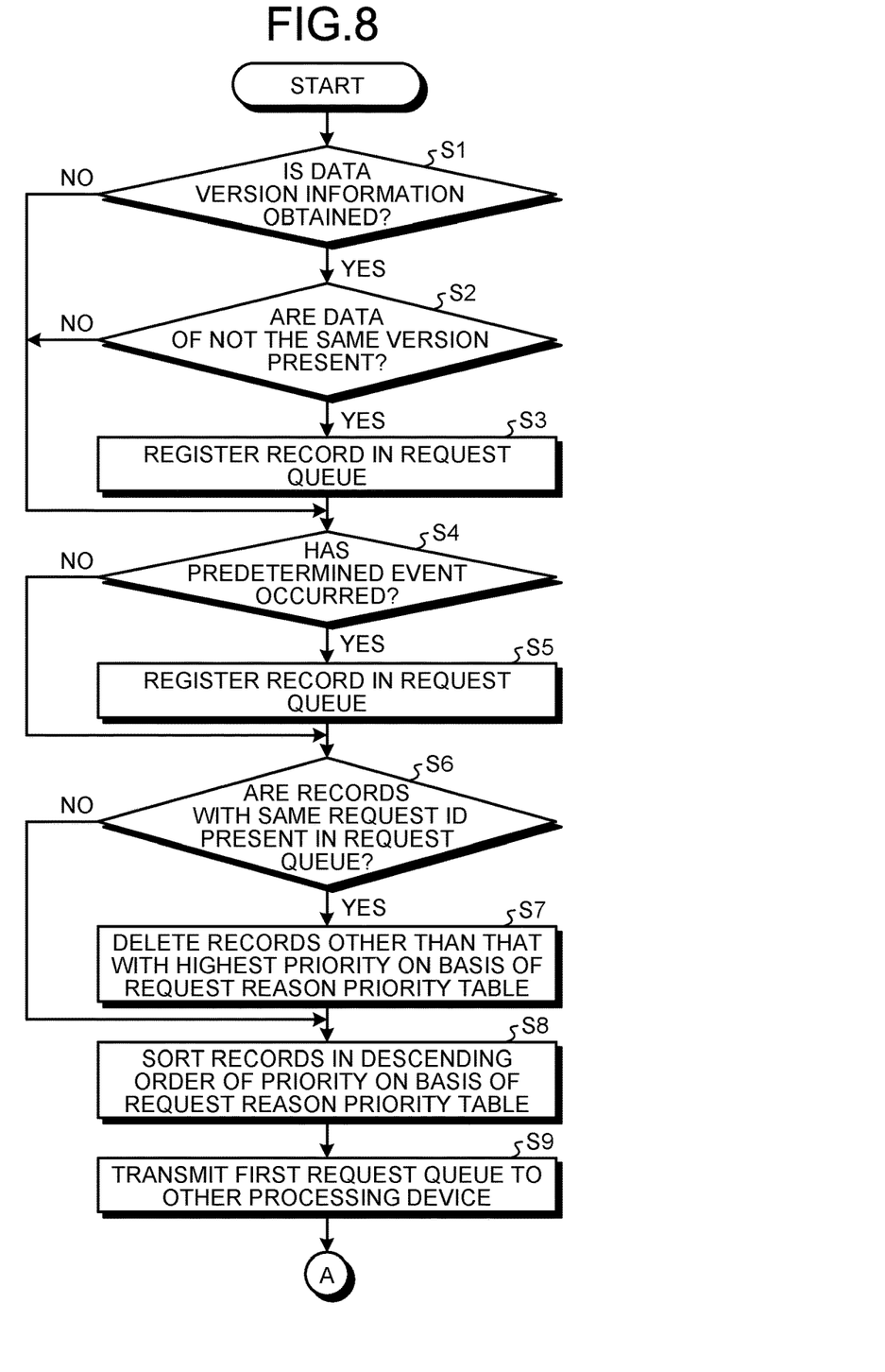
FIG. 8 is a first flowchart illustrating a process of requesting data from the traffic control system by the processing device in the safety device.
Figure 9:
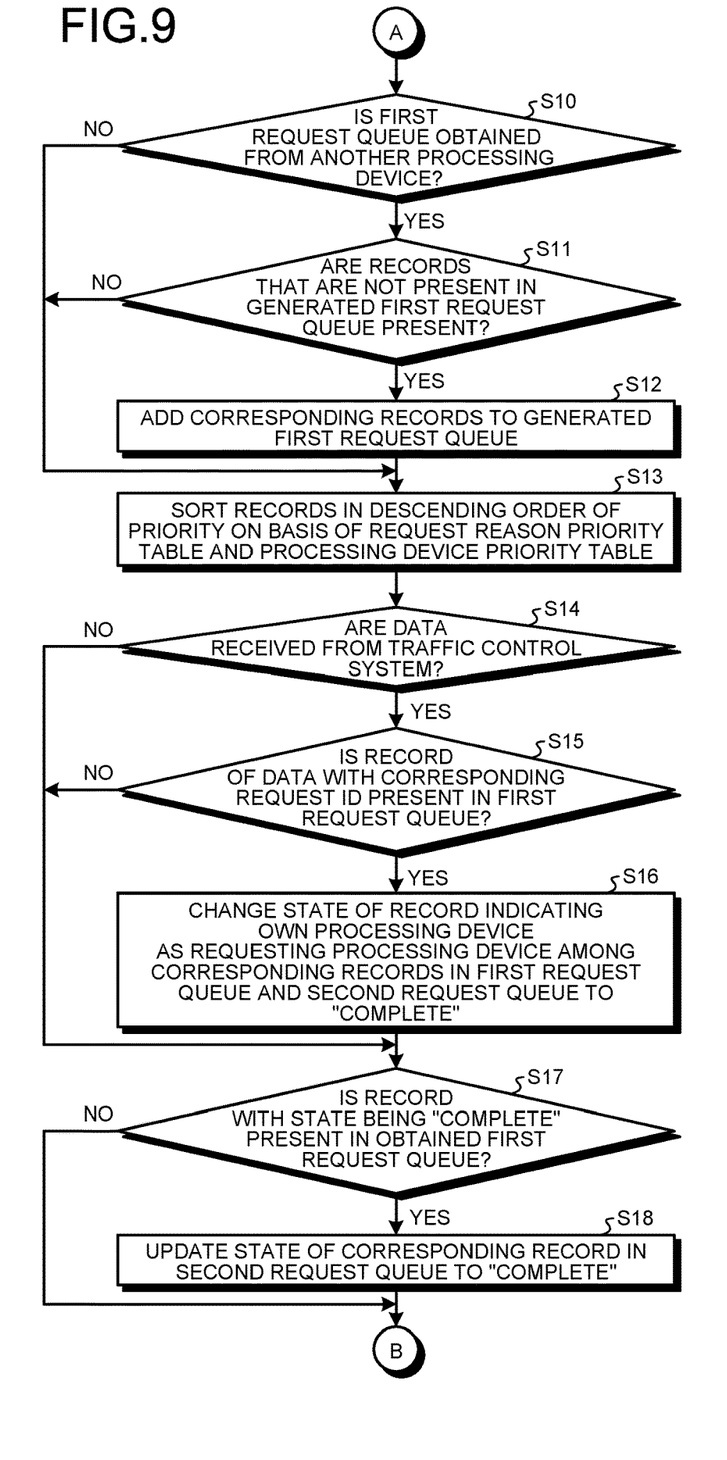
FIG. 9 is a second flowchart illustrating the process of requesting data from the traffic control system by the processing device in the safety device.
Figure 10:
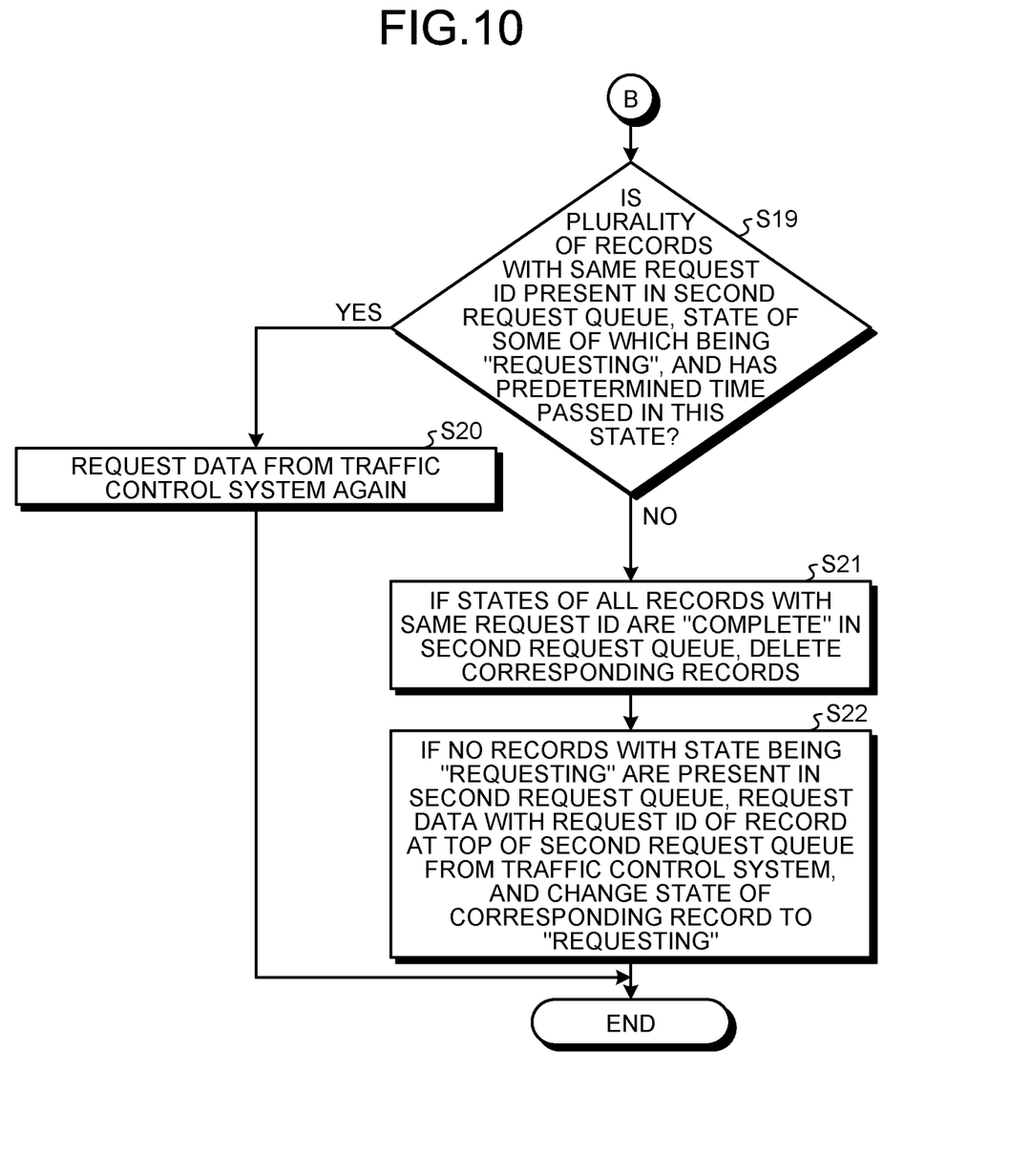
FIG. 10 is a third flowchart illustrating the process of requesting data from the traffic control system by the processing device in the safety device.

Next, a process of requesting data from the traffic control system 50 by the processor 201 in the safety device 100 will be explained. FIG. 8 is a first flowchart illustrating a process of requesting data from the traffic control system 50 by the processor 201 in the safety device 100 according to the present embodiment. FIG. 9 is a second flowchart illustrating the process of requesting data from the traffic control system 50 by the processor 201 in the safety device 100 according to the present embodiment. FIG. 10 is a third flowchart illustrating the process of requesting data from the traffic control system 50 by the processor 201 in the safety device 100 according to the present embodiment.

In the processor 201, the state managing circuitry 3 checks whether or not data version information indicating the latest version of data stored in the database 1 is obtained from the traffic control system 50 via the communication network 40, the external I/F device 71, and the communication unit 2 (step S1). If the data version information is obtained (step S1: Yes), the state managing circuitry 3 compares the version of each data indicated by the data version information with the version of data stored in the database 1. If data whose version is not the same as the latest version, that is, data of not the same version as the latest one is present (step S2: Yes), the state managing circuitry 3 outputs, to the request managing circuitry 4, the identification information on data whose version is not the same as the latest version, information that the version is not the same as the latest version, which is the reason for requesting data, and the identification information on the processor 201. The request managing circuitry 4 registers a record in a request queue (step S3). This record registered in the request queue indicates that the identification information on the data of not the same version is "request ID", being not the same version is "reason for request", the identification information on the processor 201 is "requesting processor", and the "waiting" is "state". The term "waiting" means waiting to be requested. If the state managing circuitry 3 has not obtained the data version information (step S1: No), the processing device 201 skips the processes in steps S2 and S3, and if data of not the same version as the latest version is not present in the state managing circuitry 3 (step S2: No), the processor 201 skips the process in step S3.

The state managing circuitry 3 checks whether or not a predetermined event has occurred in the train 11 (step S4). If a predetermined event has occurred (step S4: Yes), the state managing circuitry 3 outputs, to the request managing circuitry 4, the identification information on data necessary when a predetermined event has occurred, the identification information on the occurred event, that is, the predetermined event, which is the reason for requesting data, and the identification information on the processor 201. The request managing circuitry 4 registers a record in the request queue (step S5). The record registered in step 5 indicates that the identification information on the data necessary when the predetermined event has occurred is "request ID", the identification information on the predetermined event is "reason for request", the identification information on the processor 201 is "requesting processor", and "waiting" is "state". The term "waiting" means waiting to be requested. If no predetermined event has occurred (step S4: No), the processing device 201 skips the process in step S5.

The request managing circuitry 4 checks whether or not there is some overlap in the data to be requested, that is, whether or not records with the same request ID are present in the request queue (step S6). If records with the same request ID are present in the request queue (step S6: Yes), the request managing circuitry 4 deletes, from the records with the same request ID, records other than the record with the highest priority, leaving this record with the highest priority on the basis of the request reason priority table (step S7). If there are no records with the same request ID in the request queue (step S6: No), the request managing circuitry 4 skips the process in step S7. The request managing circuitry 4 sorts the records registered in the request queue in descending order of the priority on the basis of the request reason priority table (step S8). The request queue having the records sorted in descending order of the priority is the first request queue described above. The request managing circuitry 4 transmits the generated first request queue to the other processing devices via the communication unit 2 (step S9).

The request managing circuitry 4 checks whether or not a first request queue generated by another processing device is received from the other processing device via the communication unit 2 (step S10). If a first request queue generated by another processing device is received from the other processing device (step S10: Yes), the request managing circuitry 4 checks whether or not records that are not present in the generated first request queue are present in the first request queue obtained from the processing device (step S11). If records that are not present in the generated first request queue are present in the first request queue obtained from the processing device (step S11: Yes), the request managing circuitry 4 adds the corresponding records to the generated first request queue (step S12). In other words, the request managing circuitry 4 combines the generated first request queue with the first request queue obtained from the processing device. If a first request queue generated by another processing device is not received from the other processing device (step S10: No), the request managing circuitry 4 skips the processes in steps S11 and S12, and if records that are not present in the generated first request queue are not present in the first request queue obtained from the processing device (step S11: No), the request managing circuitry 4 skips the process in step S12.

The request managing circuitry 4 sorts the records registered in the request queue after the process in step S12 in descending order of the priority on the basis of the request reason priority table and the processing-device priority table (step S13). The request queue having the records sorted in descending order of the priority is the second request queue described above. The request managing circuitry 4 outputs the generated second request queue to the obtainment managing circuitry 7. The obtainment managing circuitry 7 generates data obtainment management information on the basis of the second request queue. Note that the request managing circuitry 4 uses the generated first request queue in generating the second request queue, and holds the generated first request queue by, for example, copying the generated first request queue even after the second request queue is generated.

The obtainment managing circuitry 7 checks whether or not data is obtained from the traffic control system 50 via the communication network 40, the external I/F device 71, and the communication unit 2 (step S14). If data is obtained from the traffic control system 50 (step S14: Yes), and when the corresponding data are present in the data obtainment management information, the obtainment managing circuitry 7 takes the corresponding data as "received" in the field "receive". In addition, the obtainment managing circuitry 7 outputs the identification information on the obtained data to the request managing circuitry 4. Upon obtaining the identification information on the obtained data from the obtainment managing circuitry 7, the request managing circuitry 4 check whether or not a record of data with the request ID corresponding to the identification information on the obtained data is present in the first request queue (step S15). If the record of data with the request ID corresponding to the identification information on the obtained data is present in the first request queue (step S15: Yes), the obtainment of the data is completed, after which the request managing circuitry 4 of the processing device 201 changes the records of data with the corresponding request ID in the first request queue and the second request queue such that the state of the record indicating the processor 201 as the requesting processing device is changed to "complete" (step S16). If data is not obtained from the traffic control system 50 (step S14: No), the processing device 201 skips the processes in steps S15 and S16, and if no record of data with the request ID corresponding to the identification information of the obtained data is present (step S15: No), the processing device 201 skips the process in step S16.

The request managing circuitry 4 obtains a first request queue generated by another processing device from the other processing device via the communication unit 2, and checks whether or not a record with the state being "complete" is present in the obtained first request queue (step S17). If the record with the state being "complete" is present in the obtained first request queue (step S17: Yes), the request managing circuitry 4 updates the state of the corresponding record in the second request queue to "complete" (step S18). If no record with the state being "complete" is present in the obtained first request queue (step S17: No), the request managing circuitry 4 skips the process in step S18.

The request managing circuitry 4 checks whether or not a plurality of records with the same request ID are present in the second request queue, the state of some of which being "requesting", and a predetermined time has passed in this state (step S19). If the predetermined time has passed (step S19: Yes), the request managing circuitry 4 requests the data from the traffic control system 50 again (step S20). Note that, in step S20, only the request managing circuitry 4 of the predetermined processing device practically requests the data from the traffic control system 50 again. The request managing circuitries 4 of the other processing devices do not request the data from the traffic control system 50 again.

If the predetermined time has not passed (step S19: No), and if the states of all the records with the same request ID are "complete" in the second request queue, the request managing circuitry 4 deletes the corresponding records (step S21). If no records with the state being "requesting" are present, that is, if the states of all the records are "waiting" in the second request queue, the request managing circuitry 4 requests data with the request ID of the record at the top of the second request queue from the traffic control system 50, and changes the state of the corresponding record to "requesting" (step S22). In a manner similar to step S20, only the request managing circuitry 4 of the predetermined processing device practically requests the data from the traffic control system 50 in step S22. The request managing circuitries 4 of the other processing devices do not request the data from the traffic control system 50.

In the safety device 100, each of the processing devices repeats the processes in the flowcharts illustrated in FIGS. 8 to 10. In this manner, each of the processing devices can update the second request queue into the latest state.

The request managing circuitry 4 of the processing device generates a first request queue, obtains first request queues generated by the other processing device from the other processing devices, and combines the generated first request queue with the obtained first request queues to generate a second request queue. It is noted that the second request queue may be generated in other manners. Although generating a first request queue, the request managing circuitry 4 of each of the processing devices does not request data from the traffic control system 50 by using the first request queue. Thus, records in the first request queues need not be sorted on the basis of the priority of the reason for request.

The request managing circuitry 4 of the processing device can determine the data to request from the traffic control system 50, and the order in which data are to be requested from the traffic control system 50, on the basis of the management states of data in the state managing circuitry 3 of that processing device, a type of predetermined event that requires data in a case where the predetermined event has occurred in that processor, the management states of data in the state managing circuitries 3 of the other processing devices, and the types of events that require data in cases where the predetermined events have occurred in the other processing devices. The request managing circuitry 4 can generate a second request queue by determining data to request from the traffic control system 50 and the order in which the data is to be requested from the traffic control system 50.

Specifically, the request managing circuitry 4 can determine data to request from the traffic control system 50 and the order in which the data is to be requested from the traffic control system 50 on the basis of the management states of data in the state managing circuitry 3, the management states of data in the state managing circuitries 3 of the other processing devices, a type of predetermined event that requires data in a case where the predetermined event has occurred. In this case, the request managing circuitry 4 of the processing device identifies, as the data to request from the traffic control system 50, the data of not the same version as the latest version, among the data managed in the state managing circuitry 3 of that processing device and the state managing circuitries 3 of the other processing devices. In this manner, the request managing circuitry 4 can generate a second request queue when information necessary for generating a first request queue is present instead of the state of the first request queue. In this case, the safety device 100 can reduce the processing loads on the processing devices in sorting records for generating first request queues. The request managing circuitry 4 combines the generated first request queue with the obtained first request queues to generate the second request queue in the embodiment, which processing is similar, in view of the information used, to that in the case of determining data to request from the traffic control system 50 and the order in which the data is to be requested from the traffic control system 50 on the basis of the management states of data in the state managing circuitry 3, the management states of data in the state managing circuitries 3 of the other processing devices, and the types of predetermined events that require data in cases where the predetermined events have occurred.

Next, a hardware configuration of the safety device 100 will be described. In the safety device 100, while the processing devices 201, 202, 301, and 302 are CPUs as described above, the processing devices 201, 202, 301, and 302 each may alternatively be implemented by processing circuitry. The processing circuitry may be constituted by a processor that executes programs stored in a memory and the memory, or may be dedicated hardware.

Figure 11:
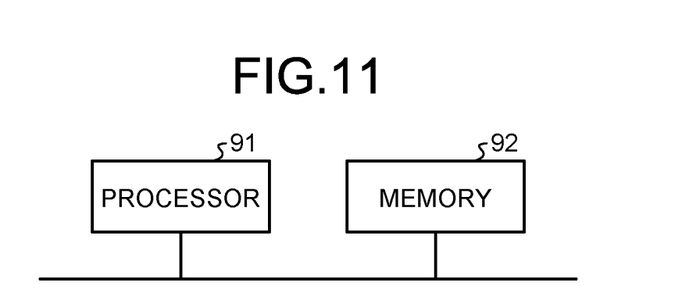
FIG. 11 is a diagram illustrating an example of a case where processing circuitry included in the safety device is implemented by a processor and a memory.

FIG. 11 is a diagram illustrating an example of a case where the processing circuitry included in the safety device 100 according to the present embodiment is implemented by a processor and a memory. In the case where the processing circuitry is constituted by the processor 91 and the memory 92, the functions of the processing circuitry of the safety device 100 are implemented by software, firmware, or a combination of software and firmware. The software or firmware is described in the form of programs and stored in the memory 92. The processing circuitry implements the functions by reading and executing the programs stored in the memory 92 by the processor 91. Specifically, the processing circuitry includes the memory 92 for storing programs that results in execution of processes of the safety device 100. In other words, these programs cause a computer to execute the procedures and the methods of the safety device 100.

Note that the processor 91 may be a CPU, a processing device, a computing device, a microprocessor, a microcomputer, a digital signal processor (DSP), or the like. In addition, the memory 92 is a nonvolatile or volatile semiconductor memory such as a random access memory (RAM), a read only memory (ROM), a flash memory, an erasable programmable ROM (EPROM), or an electrically EPROM (EEPROM: registered trademark), a magnetic disk, a flexible disk, an optical disk, a compact disc, a mini disc, a digital versatile disc (DVD) or the like, for example.

Figure 12:
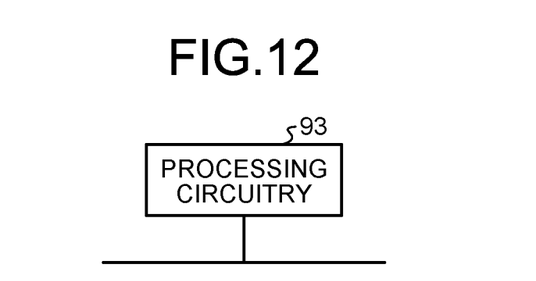
FIG. 12 is a diagram illustrating an example of a case where processing circuitry included in the safety device is constituted by dedicated hardware.

FIG. 12 is a diagram illustrating an example of a case where the processing circuitry included in the safety device 100 according to the present embodiment is constituted by dedicated hardware. In the case where the processing circuitry is constituted by dedicated hardware, the processing circuitry 93 illustrated in FIG. 12 is a single circuit, a composite circuit, a programmed processor, a parallel-programmed processor, an application specific integrated circuit (ASIC), a field programmable gate array (FPGA), or a combination thereof, for example. The functions of the safety device 100 may be implemented separately by the processing circuitry 93, or may be implemented collectively by the processing circuitry 93.

Note that some of the functions of the safety device 100 may be implemented by dedicated hardware, and others may be implemented by software or firmware. As described above, the processing circuitry is capable of implementing the above-described functions by dedicated hardware, software, firmware, or a combination thereof.

As described above, according to the present embodiment, in the train control system 60, the safety device 100 includes a plurality of processors, each of the processors determines data to request from the traffic control system 50 and the order in which the data are to be requested, and one of the processors requests data from the traffic control system 50. As a result, the safety device 100, when including a plurality of processors, can reduce differences between data stored in the databases of the processors.

In addition, the safety device 100 request data in descending order of priority. As a result, the safety device 100 can update necessary data and obtain necessary data while reducing the influence on the control of the operation of the train 11. In addition, the safety device 100 repeats the process of generating the second request queue. As a result, the safety device 100 can update the second request queue with the latest state.

While the case where the safety device 100 including a plurality of processors requests and obtains data from the traffic control system 50 in the train control system 60 has been described in the present embodiment, this is an example, and a data control system may be used instead of the traffic control system 50. This is also applicable to other uses. For example, this is also applicable to a system including autonomous driving vehicles, which are automobiles that automatically operate, and a control device for transmitting data to the autonomous driving vehicles in a case where each autonomous driving vehicle requests and obtains necessary data from the control device. In this case, a device that requests data in each autonomous driving vehicle corresponds to the terminal device, and the control device that transmits data to each autonomous driving vehicle corresponds to the external system.

The configurations presented in the embodiment above are examples of the present invention, and can be combined with other known technologies or can be partly omitted or modified without departing from the scope of the present invention.

REFERENCE SIGNS LIST

1, 51 database; 2 communication unit; 3 state managing circuitry; 4 request managing circuitry; 5 priority calculating unit; 6 request sorting unit; 7 obtainment managing circuitry; 8 computation unit; 10 A Company group; 11, 12, 13, 21, 31, 32 train; 20 B Company group; 30 C Company group; 40 communication network; 50 traffic control system; 60 train control system; 71, 72 external I/F device; 100 safety device; 200 active processing device; 201, 202, 301, 302 processor; 300 standby processing device.

The invention claimed is:

1. A terminal device comprising a plurality of processing devices, wherein the processing devices each includes:
    a database;
        state managing circuitry to manage data stored in the database;
        request managing circuitry to determine data to request from an external system and an order in which the data is to be requested from the external system on the basis of a management state of the data in the state managing circuitry, a management state of data in a state managing circuitry of another processing device, and a type of predetermined event requiring data in a case where the predetermined event has occurred, the request managing circuitry being capable of requesting data from the external system on the basis of the order; and
        obtainment managing circuitry to manage a state of obtainment of data from the external system, wherein
    the request managing circuitry generates a first request queue indicating the data to request from the external system and the order in which the data is to be requested on the basis of the management state of the data in the state managing circuitry and the type of predetermined event,
    the request management circuitry obtains, from another processing device, a first request queue generated on the basis of a management state of data in the other processing device and a type of predetermined event requiring data in a case where the predetermined event has occurred, and
    the request management circuitry combines the generated first request queue with the obtained first request queue to generate a second request queue indicating data to request from the external system and an order in which the data is to be requested by the terminal device, and request managing circuitry of a predetermined processing device requests data from the external system by using the second request queue.

2. The terminal device according to claim 1, wherein
    the state managing circuitry manages, on a data-unit by data-unit basis, whether or not a version of data stored in the database is the same as a latest version of data stored in the database, the latest version being indicated by data version information obtained from the external system, and
    the request managing circuitry identifies, as data to be requested from the external system, data of not the same version as the latest version among data managed by the state managing circuitry and a state managing circuitry of another processing device.

3. The terminal device according to claim 1, wherein
the request managing circuitry generates the first request queue by determining the order in which the data is to be requested from the external system on the basis of priorities of reasons for requesting data, and sorting records describing information on the individual data in the order of the request, and
the request managing circuitry further generates the second request queue by determining the order in which data is to be requested from the external system on the basis of the priorities of the reasons for requesting data and priorities of the individual processing devices, and sorting records describing information on the individual data in the order of the request.

4. The terminal device according to claim 3, wherein
when a processing device to control the terminal device is changed, the priorities of the individual processing devices are changed, and
when the priorities of the individual processing devices are changed, the request managing circuitry generates the second request queue by determining the order in which data is to be requested from the external system on the basis of the priorities of the reasons for requesting data and the changed priorities of the individual processing devices, and sorting records describing information on the individual data in the order of the request.

5. The terminal device according to claim 1, wherein
the obtainment managing circuitry manages whether or not data indicated in the second request queue is requested from the external system, and whether or not the data is obtained from the external system.

6. A data management method for a terminal device including a plurality of processing devices, the data management method comprising in each of the processing devices:
managing data stored in a database;
determining data to request from an external system and an order in which the data is to be requested from the external system on the basis of a management state of the data, a management state of data in another processing device, and a type of predetermined event requiring data in a case where the predetermined event has occurred; and
managing a state of obtainment of data from the external system, wherein
determining the data to request from the external system and the order in which the data is to be requested from the external system comprises generating a first request queue indicating the data to request from the external system and the order in which the data is to be requested on the basis of the management state of the data and the type of predetermined event, obtaining, from another processing device, a first request queue generated on the basis of a management state of data in the other processing device and a type of predetermined event requiring data in a case where the predetermined event requiring data has occurred, combining the generated first request queue with the obtained first request queue to generate a second request queue indicating data to request from the external system and an order in which the data is to be requested by the terminal device, and
a predetermined processing device requests data from the external system by using the second request queue.

7. The data management method according to claim 6, wherein
managing the data stored in the database comprises managing, on a data-unit by data-unit basis, whether or not a version of data stored in the database is the same as a latest version of data stored in the database, the latest version being indicated by data version information obtained from the external system, and
determining the data to request from the external system and the order in which the data is to be requested from the external system comprises identifying, as data to be requested from the external system, data of not the same version as the latest version among data managed and stored in the database and managed by another processing device.

8. The data management method according to claim 6, wherein
determining the data to request from the external system and the order in which the data is to be requested from the external system comprises generating the first request queue by determining the order in which the data is to be requested from the external system on the basis of priorities of reasons for requesting data, and sorting records describing information on the individual data in the order of the request, and further generating the second request queue by determining the order in which data is to be requested from the external system on the basis of the priorities of the reasons for requesting data and priorities of the individual processing devices, and sorting records describing information on the individual data in the order of the request.

9. The data management method according to claim 8, wherein
when a processing device to control the terminal device is changed, the priorities of the individual processing devices are changed, and
determining the data to request from the external system and the order in which the data is to be requested from the external system comprises, when the priorities of the individual processing devices are changed, generating the second request queue by determining the order in which data is to be requested from the external system on the basis of the priorities of the reasons for requesting data and the changed priorities of the individual processing devices, and sorting records describing information on the individual data in the order of the request.

10. The data management method according to claim 6, wherein
managing the state of obtainment of data from the external system comprises managing whether or not data indicated in the second request queue is requested from the external system, and whether or not the data is obtained from the external system.

* * * * *